United States Patent [19]

Ivanov

[11] Patent Number: 4,707,907
[45] Date of Patent: Nov. 24, 1987

[54] METHOD FOR SCANNING FITTING OF TWO PIECES, ONE GOING INTO THE OTHER

[75] Inventor: Rossen V. Ivanov, Sofia, Bulgaria

[73] Assignee: Institut PO Technitcheska Kibernetike I Robotika, Sofia, Bulgaria

[21] Appl. No.: 856,714

[22] Filed: Apr. 28, 1986

[30] Foreign Application Priority Data

Apr. 26, 1985 [BG] Bulgaria ................................. 69966

[51] Int. Cl.⁴ ............................................. B23P 19/02
[52] U.S. Cl. ....................................... 29/525; 29/428; 29/464; 29/821
[58] Field of Search ................. 29/DIG. 46, 428, 525, 29/464, 33 K, 700, 821

[56] References Cited

FOREIGN PATENT DOCUMENTS

| 0053586 | 5/1977 | Japan | 29/464 |
| 0649540 | 2/1979 | U.S.S.R. | 29/464 |
| 0959982 | 9/1982 | U.S.S.R. | 29/464 |

*Primary Examiner*—Mark Rosenbaum
*Assistant Examiner*—Irene Graves Golabi

[57] ABSTRACT

The invention provides a method of scanning fitting of two pieces, one going into the other, wherein an axial joining motion and a seeking vibration motion is imparted to the handled piece, such that at the beginning of the joining process, the handled piece is imparted a seeking vibration parallel with the axial joining motion, the seeking vibration motion comprising two motions—a seeking linear oscillatory cross motion and a seeking rotation—oscillatory cross motion, which are continuously and consecutively alternating within time, such that the handled piece is vibrated translationally in one plane and rotationally around the center of its front end in a second plane, as the two planes make an angle between each other and rotate around the initial position of the axis of the handled piece continuously and synchronized; and during the initial entry of one of the pieces into the other up to the moment of their final joining, the handled piece, parallelly with its axial motion, makes only a rotational—oscillatory motion, the plane of said motion continuing to rotate in a similar way.

1 Claim, 8 Drawing Figures

METHOD FOR SCANNING FITTING OF TWO PIECES, ONE GOING INTO THE OTHER

BACKGROUND OF THE INVENTION

The invention relates to a method and apparatus for scanning the mounting of two pieces, one going into the other, with or without guiding chamfers, via robots, assembly machines, mechanized tools, etc. A known method provides for vibration fitting of one piece going into another, according to which during the mounting an axial joining motion is imparted to one of the pieces and, after a touch between the two pieces, a seeking vibration motion is imparted to the second piece. After the initial entering of one of the pieces into the other, the vibration motion of one of the pieces comes to a stop, while the said motion of the first one resumes, i.e. it resumes its axial joining motion, up to the achievement of the joining. See, Russian Author's Certificate No. 770726, MPK$^3$ B.23 P 19/04.

The disadvantages of this known method are as follows:

there is no purposeful seeking motion between the two pieces, which lengthens the time needed for joining, lowers productivity and the reliability of the fitting;

there is no compensation for the angular misalignment between the two pieces at the initial moment of joining as well as after the entering of the one piece into the other.

Russian Author's Certificate No. 770726, MPK$^3$ B 23 P 19/04 also discloses an apparatus for mounting two pieces, one going into the other, comprising a vibrator fitted into a tool carrying one of the pieces. The vibrator has two channels with inlet openings for each of them, connected to a pressure source, and with outlets for each of the said channels, outgoing into atmosphere, as a freely moving ball is placed into each channel. The radii of the balls going around the axis of the vibrator, are different.

The disadvantages of this known apparatus are as follows:

it does not ensure fitting of the pieces with small gaps and without guiding splays;

it does not ensure a lack of jamming and wedging between the joined pieces and does not reduce the contact tension between the pieces, and as a result it increases the effort needed for their joining.

SUMMARY OF THE INVENTION

An object of the present invention is to provide a method and apparatus for scanning joining of two pieces, one going into the other, which ensures a maximum tight scanned zone, with a relatively high productivity and reliability of the fitting, independent of the availability or the lack of guiding splays, by eliminating the possibility for jamming and wedging, and decreasing the effort needed for joining. This object is achieved by a method for scanning fitting of two pieces, one going into the other, wherein, during the mounting process an axial joining motion is created, as well as a seeking vibration motion.

According to the present invention, one of the pieces is handled, while the other piece remains stationary. The handled piece is handled by a robot or other mechanized tool. At the beginning of the process, parallelly to the axial motion, a seeking vibration motion is imparted to the handled piece, as the said motion comprises two motions: a seeking linear vibration motion, and a seeking rotational vibration-cross wise motion, continuously and consecutively alternating with each other within time, as the piece vibrates translationally in one plane and rotationally around the center of its front end in a second plane. The two planes make an angle between each other and rotate around the axis of the handled piece continuously and synchronized, so that the handled piece scans towards its initial position, overcoming the original angular and lateral misalignment between the pieces. Then, during the initial entering of one of the pieces into the other and up to their final joining, the handled piece, parallelly to its axial motion makes just a rotational vibration motion, which plane continues to rotate the same way, by which the angular misalignment between the pieces is entirely overcome.

An apparatus for performing the method of the invention comprises a vibrator with two channels, each having an inlet opening connected to a pressure source, and each channel having one outlet outgoing into the atmosphere. There is one freely moving ball in each channel, as the radii of the balls going round the axis of the vibrator, are different. According to the invention, the inlet opening of the first channel is directed opposite to the inlet opening of the second channel, and the ball placed in the first channel freely moves in a direction opposite to that of the ball placed in the second channel. The vibrator is fixed to a passive accommodator and connected to a gripper. The advantages of the method and apparatus for scanning fitting are as follows:

realization of a complex scanning motion, which overcomes the lateral and angular misalignment between the joined pieces, and at the same time eliminating the effect of increasing one of the misalignment by the overcoming of the other;

decreasing the time needed for the joining and increasing the reliability of the fitting as a result of the maximum tightening of the scanning zone;

automated achievement of the joining and the precise joints with minimum gap, with minimum or entirely missing leading chamfers;

eliminating the jamming and wedging of the pieces and decreasing the joining force.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION OF THE PREFERRED EMBODIMENT

Figure 3:
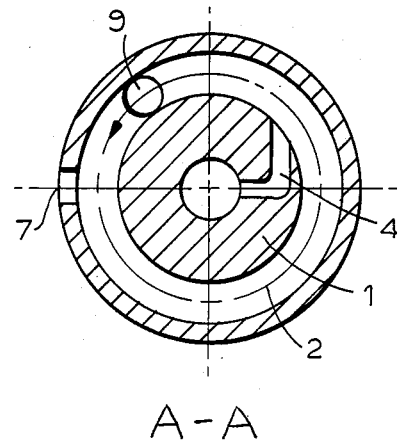
FIG. 3 is a sectional view along line A—A from FIG. 2.
Figure 4:
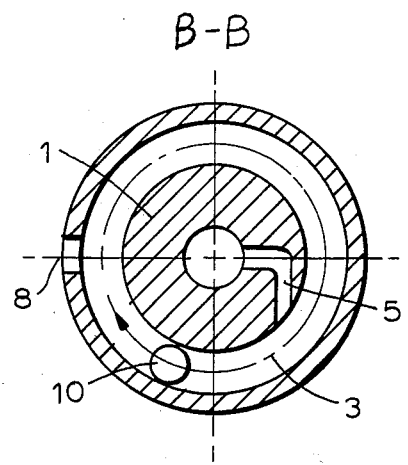
FIG. 4 is a sectional view along line B—B from FIG. 2.
Figure 2:
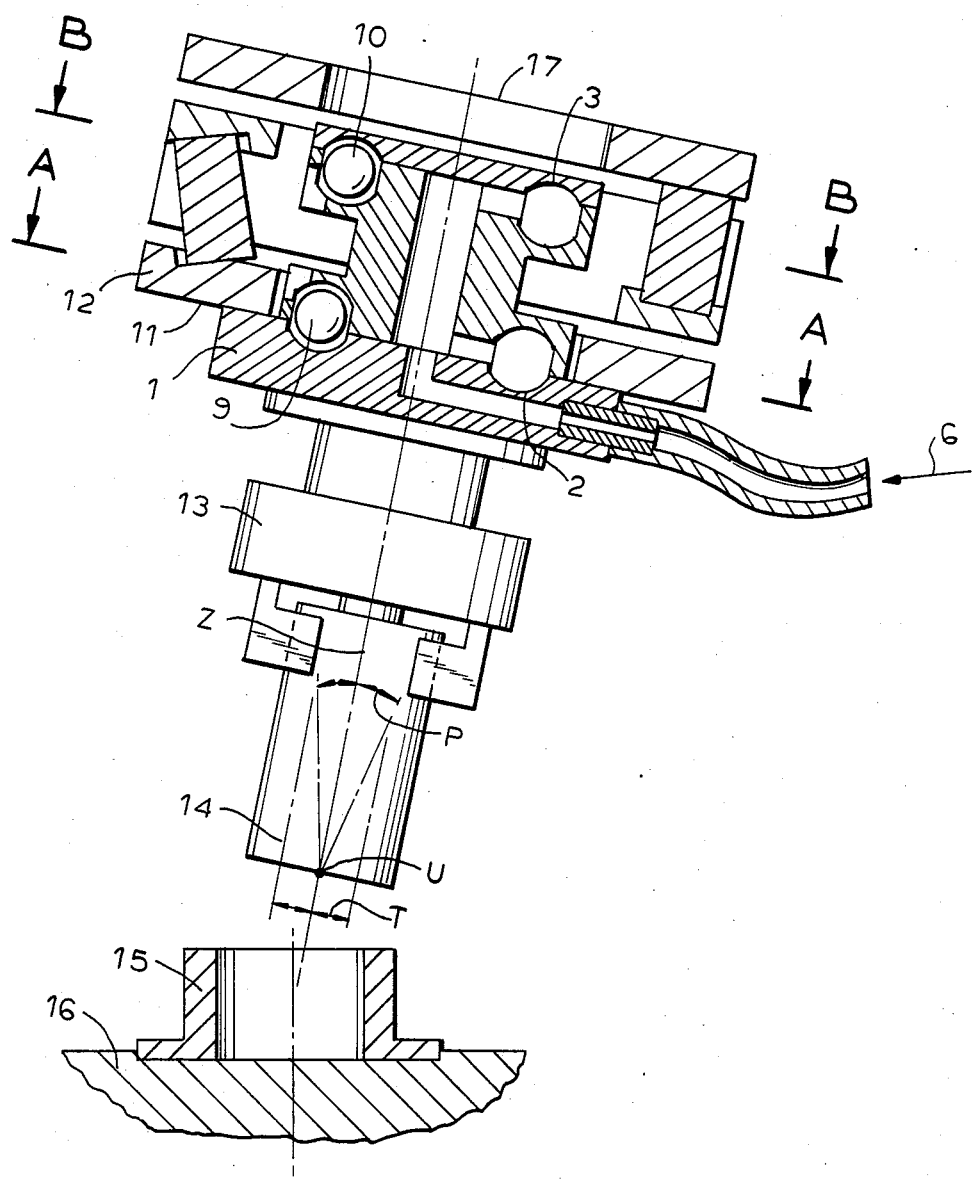
FIG. 2 is a sectional view along the axis of symmetry of the vibration meeting.

Referring to FIG. 2, the apparatus for scanning fitting comprises a vibrator 1 which has a first thoroidal channel 2 and a second thoroidal channel 3, with small difference between their diameters. Referring to FIGS. 3 and 4, each channel has an inlet opening 4, respectively 5, connected to a pressure source 6 (FIG. 2) and one outlet 7, respectively 8 outgoing into the atmosphere. The channels 2 and 3 are at a distance from one another and in each of them is placed one freely moving ball 9, respectively 10. The inlet opening 4 of the first channel 2 is directly opposite the inlet opening 5 of the second channel 3, and the ball 9, placed in the first channel 2, freely moves in a direction opposite to that of the ball 10, placed in the second channel 3.

Figure 1:
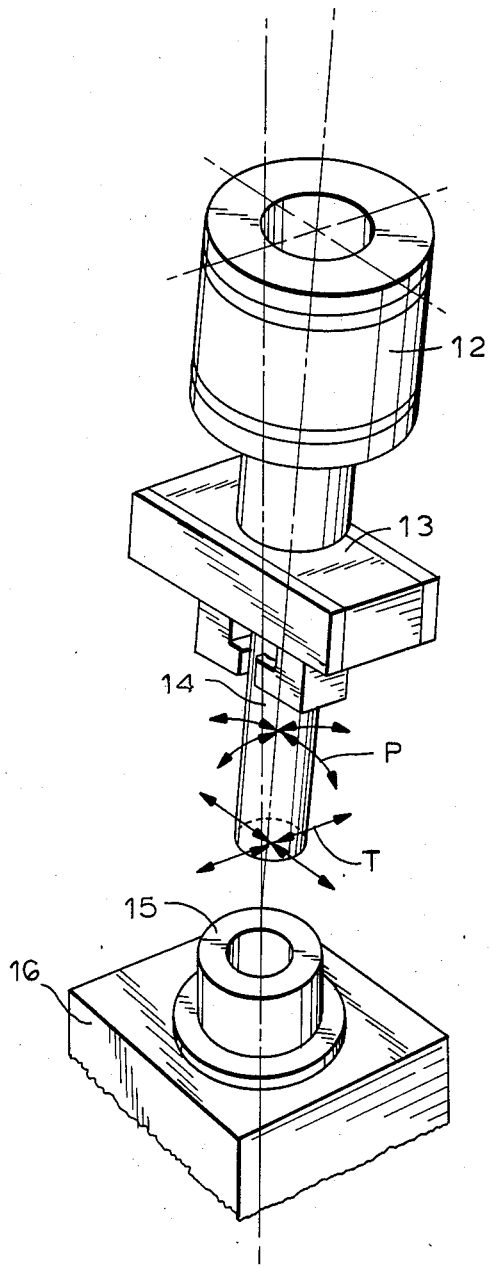
FIG. 1 is a perspective view of the apparatus of the present invention.

Referring to FIGS. 1 and 2, vibrator 1 is fixedly connected to the front flange 11 of a passive accommodator 12 and to gripper 13, carrying the handled piece 14. The stationary piece 15 is fixedly connected to a base tool 16. The passive accommodator 12 has a base 17, fixedly connected to the end link of a robot (not shown in the figures).

Figure 5:
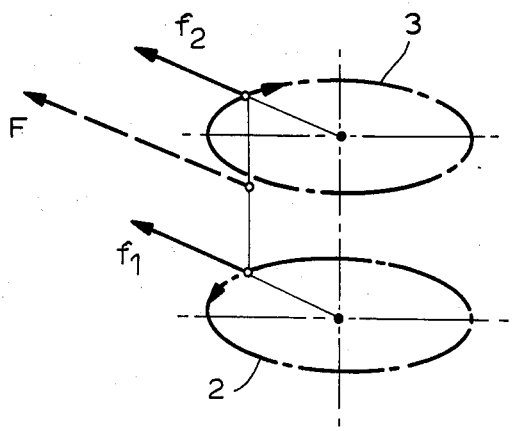
FIG. 5 is a force diagram at a unidirectional location of the centrifugal forces of the vibration meeting.
Figure 7:
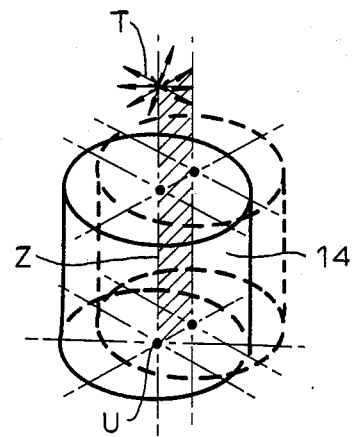
FIGS. 7 and 8 are schematic diagrams of the seeking linear and angular vibration cross-wise motions of the handled piece.
Figure 6:
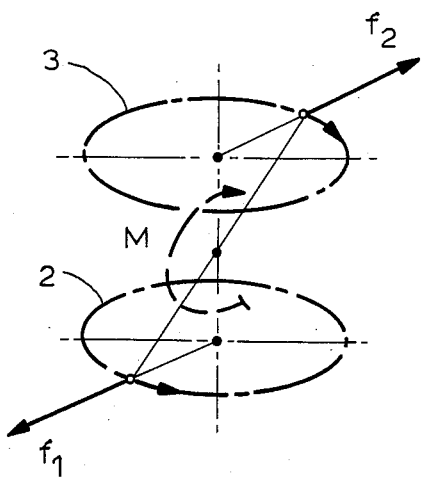
FIG. 6 is a force-moment diagram at a location of the centrifugal forces at different directions.
Figure 8:
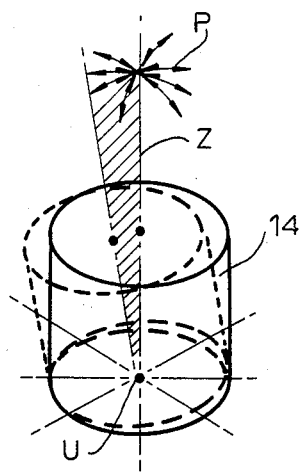

The method of the invention is revealed by the action of the apparatus of the invention for a vibration fitting, which principle is as follows:

At the beginning of the joining process, the handled piece 14 receives an axial joining motion by the chain (robot—passive accommodator 12—vibrator 1—catcher 13). Parallel to that, a pressure is fed from source 6 to the vibrator 1 and to its channels 2 and 3. As a result, the balls 9 and 10 start to move in opposite directions along the channels 2 and 3, creating respectively centrifugal forces (FIGS. 5 and 6). As the balls 9 and 10 have equal weights and move along circumferences with approximately equal diameters, they create actually equal centrifugal forces $f_1$ and $f_2$ respectively (FIGS. 5 and 6). When the balls 9 and 10 pass each other, centrifugal forces $f_1$ and $f_2$, result in the force F which varies from a value equal to the sum of $f_1$ and $f_2$ as shown in FIG. 5, to a value equal to 0 as the two forces $f_1$ and $f_2$ as shown in FIG. 6 are subtracted. At the moment, when F is 0 as shown in FIG. 6, the forces $f_1$ and $f_2$ act as a pair and create towards the axis of the handled piece 14 a bending moment M. During their manifold going around, the balls 9 and 10 pass each other at different points and create a scanning effect as a result of minimum difference between the sizes of the diameters of the channels 2 and 3, thus ensuring a maximum tightening of the scanning zone.

The complex action of the scanning process is due, first to the fact that the vector of force F continuously rotates from 0 degrees up to 360 degrees and cyclically varies from 0 to maximum and vice versa, and second to the fact that the plane of the bending moment M continuously rotates from 0 degrees to 360 degrees, as its value changes also cyclically from 0 to maximum and vice versa. At that, the force F and the moment M act consecutively, alternating with each other—when the force F reaches its maximum value, the moment M is equal to 0 and vice versa—at maximum moment M the force F is equal to 0. Thus created, the force F and the moment M influence the passive accommodator 12. Under the action of the force F, its front flange 11 is translated crosswise to the axis of the handled piece 14. And under the action of the moment M, the front flange 11 rotates towards the center of rotation Z of accommodator 12 (FIG. 2) which is a center of the front end of the handled piece 14. Thereby, the handled piece 14 vibrates translationally T with an oscillation in one plane and rotationally around the center of its front end with an oscillation P in a second plane.

The two planes make an angle and rotate around the initial position U of the axis of the piece 14, incessantly and synchronized. As a result of the oscillation movement T and P, between the handled piece 14 and the stationary piece 15, a lateral alignment is created as a minimum and respectively an initial entry of one into the other. From that moment up to the achievement of a full alignment between them, and up to their final joining, the handled piece 14, parallel to its axial motion, makes only a rotational-oscillatory cross motion P, because of its confinement between the walls of stationary piece 15.

Although the invention is described and illustrated with reference to a single embodiment thereof, it is to be expressly understood that it is in no way limited to the disclosure of such preferred embodiment, but is capable of numerous modifications within the scope of the appended claims.

I claim:

1. Method of scanning fitting of two pieces, one going into the other, wherein one of said pieces is a handled piece and has a central axis extending from a front end to a back end and is handled by a machine at its back end and the other of said pieces is stationary, said method comprising the steps of first imparting the handled piece with a seeking vibration motion and an axial joining motion, said seeking vibration motion comprising two components, namely a seeking linear oscillatory component which is substantially parallel with the axial joining motion and a seeking rotation oscillatory component, which two components are continuously and consecutively alternating within time, such that the handled piece vibrates translationally in one plane and rotationally around the center of its front end in a second plane, and the two planes make an angle between each other and rotate around an initial position of the axis of the handled piece continuously and synchronized, and then from the time of an initial entry of one of the pieces into the other up to the time of their final joining, the handled piece, parallelly with its axial motion, making only said rotational oscillatory motion about said second plane, which second plane continues to rotate in a similar way.

* * * * *